May 22, 1956  C. F. DALE  2,746,200

ARTIFICIAL LURE

Filed Aug. 28, 1953

Charles F. Dale
INVENTOR.

BY *Clarence A. O'Brien*
*and Harvey B. Jackson*
Attorneys

2,746,200

ARTIFICIAL LURE

Charles F. Dale, Mayhill, N. Mex., assignor of fifty per cent to William R. Musick, Mayhill, N. Mex.

Application August 28, 1953, Serial No. 377,060

2 Claims. (Cl. 43—42.04)

This invention relates to an artificial fishing lure having improved structural and functional characteristics not found, it is believed, in similarly constructed and performing prior art lures.

With a view toward accomplishing the novel end result desired the improved construction is characterized by two complemental creatures each in resemblance of a minnow, crawfish or the like, one, the main minnow, being baited at its head end, preferably on the nose, with a smaller secondary minnow which is preferably rotatable when in the water, the two minnows thus assembled giving the deceptive appearance of the smaller or secondary minnow having been caught by the main minnow, the latter poised to swallow him, whereby to impart the idea to a natural nearby fish who, in taking advantage of the situation, is attracted thereby and is consequently enticed to strike at both minnows at the same time.

Another object of the invention has to do with the above recited dual minnow bait wherein either or both parts thereof may be constructed to resemble different creatures and especially wherein the secondary or smaller one may be made in imitation of a bug, fly, insect, worm or the like, spinning freely to provide the desired animation and alluring properties.

Stated otherwise the invention has to do with a two-part bait characterized by a body shaped in imitation of a main minnow or the like and including a head having a nose at its leading end, a stub shaft fixed to and protruding axially beyond said nose, and a companion but secondary minnow, appreciably smaller than said main minnow, mounted on said stub shaft, said secondary minnow being in close proximity to said nose to give the appearance of having been caught for consumption by the main minnow, whereby said minnows, collectively considered, constitute an enticing morsel for an attracted fish.

Then, too, novelty is predicated on the above construction wherein the main or first named minnow has a pronglike extension depending from its central side, the extension being preferably situated adjacent to the nose, and there being a fishhook having a shank pivotally connected to said central portion and situated rearwardly of and adjacent to the trailing end of the main minnow along with a spring clip or clasp which is fixed to the ventral portion to releasably hold and engage the shank means against the ventral side until the strike is made.

Other objects, features and advantages will become more readily apparent from the following description and the accompanying sheet of drawings.

Figure 1:
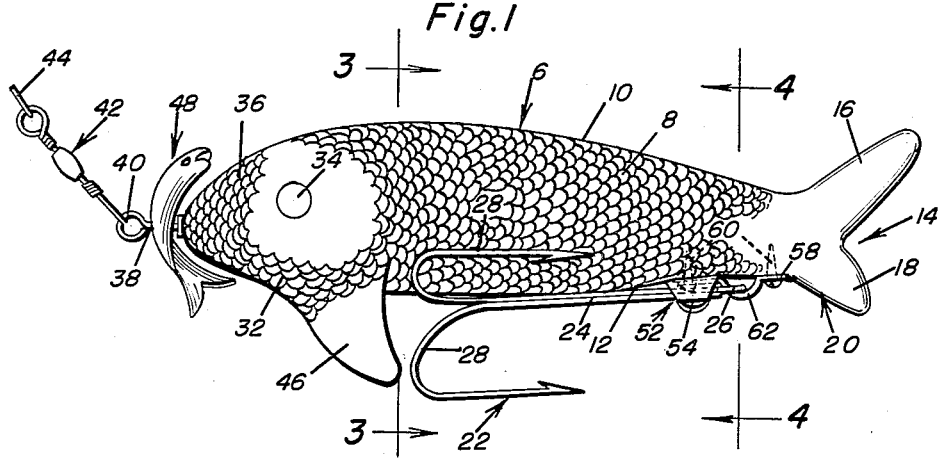
Figure 1 is a side elevation of an artificial bait or lure constructed in accordance with the principles of the present invention and showing the fishhook means in its initial or set position.
Figure 3:
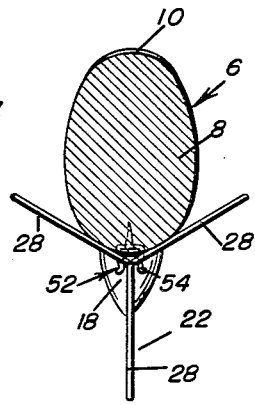
Figure 4:
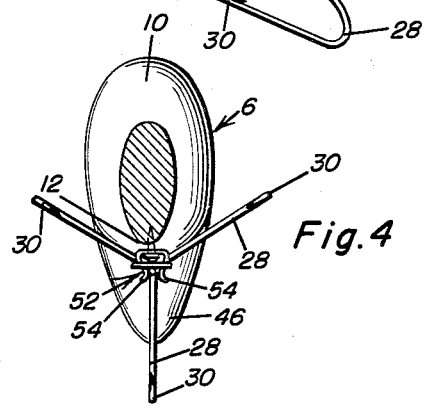

Figures 3 and 4 are cross-sections on the lines 3—3 and 4—4, respectively, of Figure 1, looking in the direction of the respective arrows.

It will be understood that the expression "creature" is used to cover whatever kind or species of bait the manufacturer desires to make in simulation. The over-all inventive idea may, however, be comprehended, it is believed, by describing the bait proper as a two-part assembly with the respective parts made to resemble or in imitation of so-called minnows. The primary or main minnow, the larger one, is denoted by the numeral 6. This comprises a suitably shaped and finished body portion 8 the upper side of which is called the dorsal surface or side as at 10 and the lower or belly portion of which is designated as the ventral side 12. The rear tapering end is provided with a bifurcated portion which is here called a tail portion 14. The upper furcation or extension is an appropriately shaped lug appearing in side elevation in the manner shown in the drawing and this is denoted by the numeral 16 and it is extended upwardly and rearwardly at an oblique angle to the dorsal side 10. There is a shorter furcation or extension 18 at the bottom which extends rearwardly and downwardly and the surface 20 thereof is at an oblique angle to the ventral surface where it functions, partly, as a stop or check for the fishhook means 22. The latter is preferably a treble-prong construction and is characterized by shank means 24 having an attaching and hinging eye 26 having curvate or lateral bends 28—28 defining the hooks which terminate in terminal barbs 30. Resuming the description of the minnow 6, this has a head portion 32 with eyes 34 and a nose or mouth portion 36. Extending axially and outwardly from the latter is a stub shaft 38 terminating in an eye 40 to which the swivel means 42 carrying the fishing line 44 is pivotally connected. There is a depending rudder-like prong or extension 46 which extends below the ventral side and is situated close to the nose or head and in proper spaced relation from the hook means. The spinner is here shown in the form of a secondary smaller or miniature minnow 48 which is rotatable on the shaft 38 between the end thrust washer 50 and the eye 40. This is shaped and it appears in practice when it is spinning to be in the process of being swallowed by the larger or main minnow 6, as is obvious.

The hook means is held against the ventral side, as shown in Figure 1, by a spring clip or clasp 52. This has depending spring jaws 54 with laterally flared free ends. There is an anchoring wire or rod provided and this is provided at opposite ends with eyes 56 and 58 secured in place by screws 60—60. One of the screws serves to constitute the fastener for the clasp 52 as is shown. The intermediate portion of the rod is formed with a bend 62 which provides a hinging and attaching device for the eye 26. It will be noticed that when the hook means is set and ready for fishing as shown in Figure 1 at least two of the hooks straddle the opposite sides of the body portion 8. When the hook is released and swings down and back the shank means may abut the tail extension 20 which then constitutes a stop element.

The extension 46 in practice breaks the water and makes the lure easy to retrieve and has a rudder-like function. Also, when retrieving across a current of water it serves to turn the lure slightly on the side which turns the hook point or barb slightly down the stream to be a direct target for the striking fish, this being noticeable because the fish do swim, it is believed, with heads upstream. This extension also has the purpose of guarding the hooks and assists in carrying the lure over weeds and debris in the water. It, in addition, has the appearance of gills or fins and helps to give the bait a less obstructed movement when so-called weeds are encountered in its course of movement. The hooks, hanger and clip or clasp means are coated with a bright shiny metal to assist in drawing attention of the fish to the bait. When the hook is in the position seen in Figure 1 it has the deceptive appearance of side fins.

Figure 2:
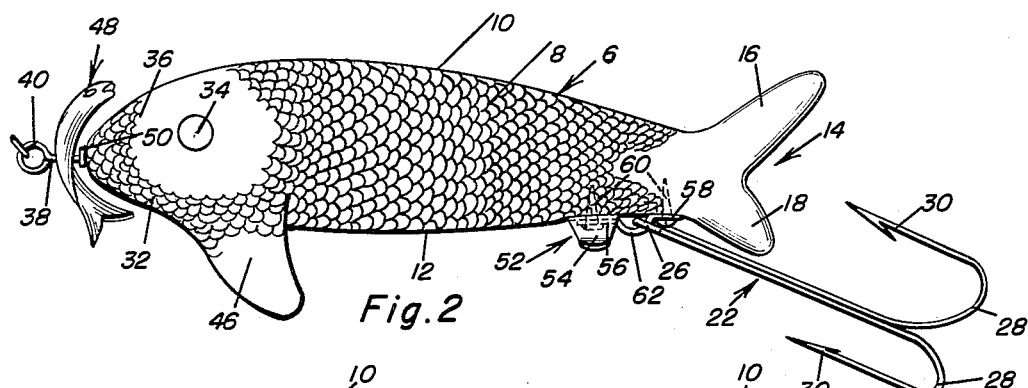
Figure 2 is a view based on Figure 1 and illustrating the fishhook after it has been released and in which position the catch is usually made.

The tail of the lure is so shaped and the hook means so spaced that when a fish strikes and the hook swings to the position shown in Figure 2 the hook and extension 18 cooperate and prevent the fish from plunging off of the hook.

Although it is of incidental consideration the body portion of the lure may be said to be shaped to resemble a human leg in elevation, that is, the calf of the leg below the knee with the tail serving to resemble a "boot" or shoe with a heel and toe portion 16 and 20 respectively. This aspect is incorporated in that the over-all bait has the peculiar function of a souvenir.

Experience has shown that most fish strike at a plug or bait from the rear and towards the direction in which the bait is being moved and when these hooks are swung in the hanger clasp the points or barbs are in a position to constitute a satisfactory target for the intended strike by the victim. When the fish strikes the barbs become embedded, the pull of the fish on the hook means causes it to swing from the set to the released position as is evidenced from the drawing. The fishhook means when in latched position in the catch occupies the position in Figure 1 rearwardly of the extension 46 thus adding to the aforementioned weedless aspect of the invention. In instances where snags in the water are not to be met the device may be used with the hook means released in the position seen in Figure 2, as is obvious.

Since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. An artificial lure comprising, in combination, a main body having the general appearance of a minnow and including a head having a nose at its leading end, a stub shaft fixed to and protruding axially beyond said nose, a companion but secondary body having the general appearance of a minnow and appreciably smaller than the main body mounted for free rotation on said stub shaft, said secondary body being in close proximity to said nose to give the appearance of having been caught for consumption by the main body, said main body having a prong-like extension integral with and depending laterally from its ventral side and situated rearwardly of but adjacent to said nose, said main body having a tail portion V-shaped in side elevation and including an upwardly and rearwardly directed component and a complemental lower downwardly and rearwardly directed component, the latter being oblique angled relative to said ventral side, a spring clip fixed to said ventral side and located forwardly of said oblique-angled tail component and rearwardly of the aforementioned prong-like extension, a fishhook assembly embodying a shank pivotally connected to said ventral portion between said clip and said oblique angled tail component, said shank underlying said ventral portion and being releasably connected with said clip and having a free end portion provided with a plurality of circumferentially spaced barbed hooks at least two of which are in positions straddling opposite vertical sides of the intermediate portion of said main minnow.

2. The structure defined in claim 1 and wherein said prong-like extension, clip, and oblique angled component are in alignment with each other in respect to the lengthwise dimension of said ventral side, said shank being of a length greater than the length of said oblique angled component, and said shank being adapted to swing against a forwardly and downwardly facing surface of said component when a strike is had, whereby said component may constitute a stop for said shank.

References Cited in the file of this patent

UNITED STATES PATENTS

| | | |
|---|---|---|
| 765,482 | Hardy | July 19, 1904 |
| 1,073,199 | Wilt | Sept. 16, 1913 |
| 1,226,891 | Jay | May 22, 1917 |
| 1,365,813 | Brown | Jan. 18, 1921 |
| 1,499,819 | Goble | July 1, 1924 |
| 2,189,487 | Davenport | Feb. 6, 1940 |
| 2,517,298 | Gaylord | Aug. 1, 1950 |
| 2,549,563 | Hansen et al. | Apr. 7, 1951 |